United States Patent [19]
Barrett et al.

[11] Patent Number: 5,561,740
[45] Date of Patent: Oct. 1, 1996

[54] METHOD AND SYSTEM FOR PROVIDING MULTIPLE INSTANCES IN A SINGLE MULTIPLE-INSTANCE OBJECT

[75] Inventors: Kevin L. Barrett; Ajit T. Dingankar; Tien N. Le, all of Austin, Tex.

[73] Assignee: International Business Machines Corporation, Armonk, N.Y.

[21] Appl. No.: 354,698

[22] Filed: Dec. 13, 1994

[51] Int. Cl.$^6$ ..................................................... G06F 17/00
[52] U.S. Cl. .............................. 395/62; 395/700; 395/600
[58] Field of Search ................................. 395/62, 700, 600

[56] References Cited

U.S. PATENT DOCUMENTS

| | | |
|---|---|---|
| 4,675,829 | 6/1987 | Clemenson . |
| 4,918,621 | 4/1990 | Nado et al. . |
| 4,930,071 | 5/1990 | Tou et al. ................................. 364/300 |
| 5,241,622 | 8/1993 | Honma ....................................... 395/62 |

OTHER PUBLICATIONS

Kim, W. "Architectural Issues . . . , " Mar./Apr. 1990, pp. 29–38.

*Primary Examiner*—Robert W. Downs
*Assistant Examiner*—A. Katbab
*Attorney, Agent, or Firm*—Mark E. McBurney; Keith L. Hargrove; Andrew J. Dillon

[57] ABSTRACT

A method and system for providing representation of multiple entities in a single multiple-instance object is disclosed and provides a powerful and economical way of representing objects in an object oriented knowledge based data processing system. A multiple-instance object contains slots and slot values which enable the access and modification of all entities represented by the multiple-instance object. The instance unique data, the context which defines an instance state, and the procedure to instantiate the multiple-instance object are all stored in the multiple-instance object. The processing or reasoning of the knowledge based system occurs as though objects exist for entities represented.

9 Claims, 6 Drawing Sheets

METHOD AND SYSTEM FOR PROVIDING MULTIPLE INSTANCES IN A SINGLE MULTIPLE-INSTANCE OBJECT

BACKGROUND OF THE INVENTION

1. Technical Field

The present invention relates in general to data processing systems and, more particularly, to object oriented knowledge based systems. More specifically, the present invention relates to a method of using a single object to represent multiple instances of similar entities within an object oriented system.

2. Description of the Related Art

Typically, in an object oriented system, similar entities are defined by an object class and the entities themselves are represented by object instances of the class. In some cases, the number of object instances may be large and the differences between the object instances as represented by slot values, may be small. The large number of object instances may prevent the object oriented system designer from specifying all the object instances even though the knowledge domain of all instances is known, requiring the object instances to be created as referenced.

FIG. 1 illustrates the hierarchy of a typical object class-instance arrangement. In block 1 is a class object having attributes represented by slot one and slot two. Slot one represents an attribute which has a common value for all instances of the class; therefore, the slot and value are defined in the class, but the value of this attribute is unique to each instance; therefore, the slot is defined in the class object, but the slot values are defined in the instance objects. The instance objects defined from the class object 1 are shown in blocks 3, 5, and 7. Block 3 is an instance object one where slot one has an inherited slot and an inherited value from the object class, while slot two has an inherited slot and a unique instance value. Likewise, for instance object two and instance object n in blocks 5 and 7, respectively, they too, in slot one, have an inherited slot and value from the object class, whereas in slot two they further have a unique instance value.

Unfortunately, the above approach requires at least n instance objects and adequate storage space for all n instance objects, even though there are few differences between each of the n objects. Accordingly, what is needed is a method for using a single object to represent multiple instances of very similar entities.

SUMMARY OF THE INVENTION

It is therefore one object of the present invention to provide a data processing system.

It is another object of the present invention to provide an object oriented knowledge based data processing system.

It is yet another object of the present invention to provide a method of using a single object to represent multiple instances of similar entities within an object oriented system.

The foregoing objects are achieved as is now described. According to the present invention, a method and system for providing representation of multiple entities in a single multiple-instance object is disclosed and provides a powerful and economical way of representing objects in an object oriented knowledge based data processing system. A multiple-instance object contains slots and slot values which enable the access and modification of all entities represented by the multiple-instance object. The instance unique data, the context which defines an instance state, and the procedure to instantiate the multiple-instance object are all stored in the multiple-instance object. The processing or reasoning of the knowledge based system occurs as though objects exist for entities represented.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF SPECIFIC EMBODIMENTS

Figure 2:
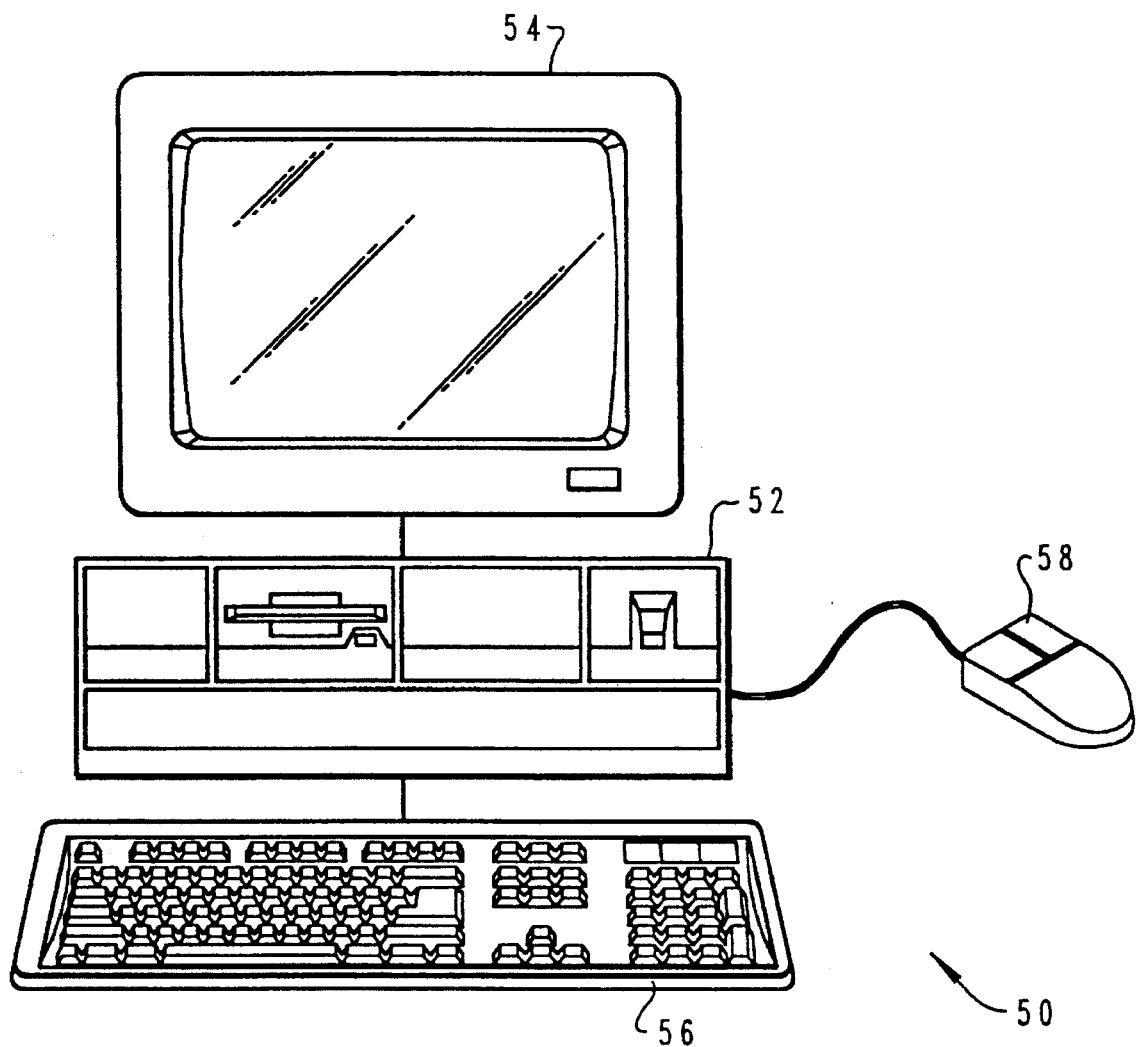
FIG. 2 is a pictorial representation of a data processing system that may be utilized to implement a method and system of the present invention.

With reference now to the figures and in particular with reference to FIG. 2, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Computer 50 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and PS/2 is a registered trademark of International Business Machines Corporation. Although the depicted embodiment involves a personal computer, a preferred embodiment of the present invention may be implemented in other types of data processing systems, such as for example, intelligent work stations or mini-computers.

Figure 3:
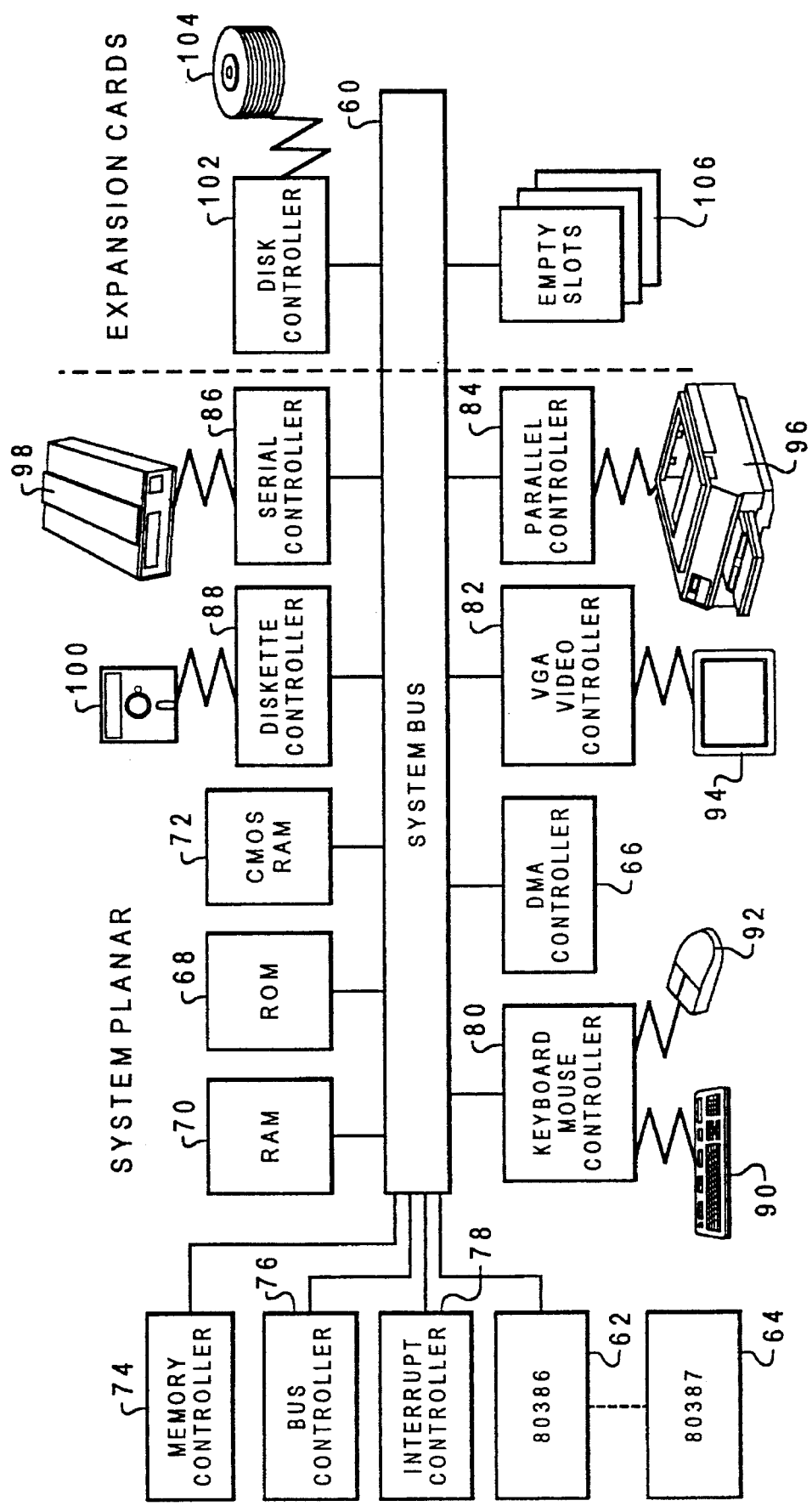
FIG. 3 depicts a block diagram of selected components in the data processing system illustrated in FIG. 2 in which a preferred embodiment of the present invention may be implemented.

Referring now to FIG. 3, there is depicted a block diagram of selected components in personal computer 50 in which specific embodiments of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from international Business Machine Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 96. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

The computer system also provides an object oriented environment in which the present invention operates.

Figure 4:
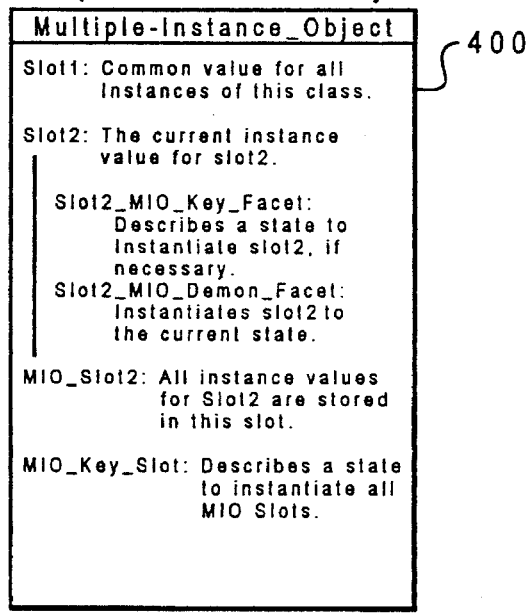
FIG. 4 is a block diagram of a multiple-instance object in accordance with a preferred embodiment of the present invention.

FIG. 4 depicts a block diagram of a multiple-instance object 400. Multiple-instance object (MIO) 400 contains the slots and slot values needed to describe the object class, the unique information to describe each instance of the object represented, and the method to create the current instance represented by the object. Multiple-instance object 400 is accessed in similar fashion as though a specific instance of the object existed. The context that defines the current instance state determines which one of the multiple entities is being represented by the multiple-instance object during an object access.

The instance specific information is contained in the slots of multiple-instance object 400. For each slot that has different values for different instances, for example, slot two, the multiple-instance object must have a corresponding MIO slot. Within each slot that has a different instance value, there is a facet (slot2_MIO_key_facet) that describes a state to instantiate the particular slot, if necessary. An additional facet (slot2_MIO_demon_facet) is used to instantiate the slot to the current state. A slot that has a common value for all instances, such as slot one, does not require a corresponding MIO slot.

Figure 1:
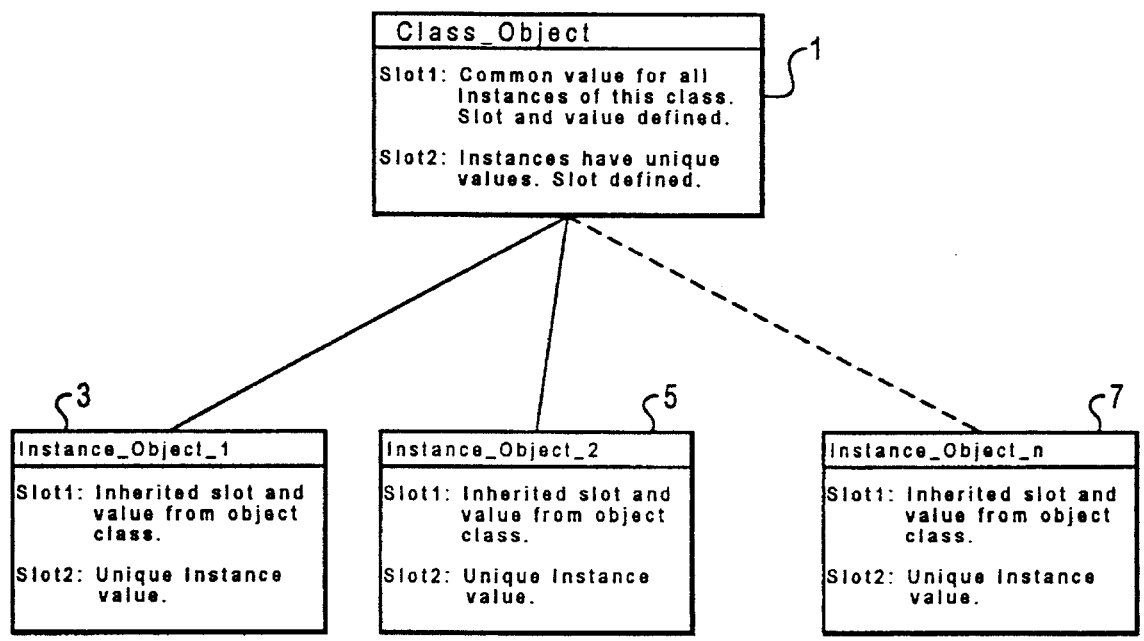
FIG. 1 illustrates the hierarchy of a typical object class-instance arrangement in accordance with a preferred embodiment of the present invention.
Figure 5:
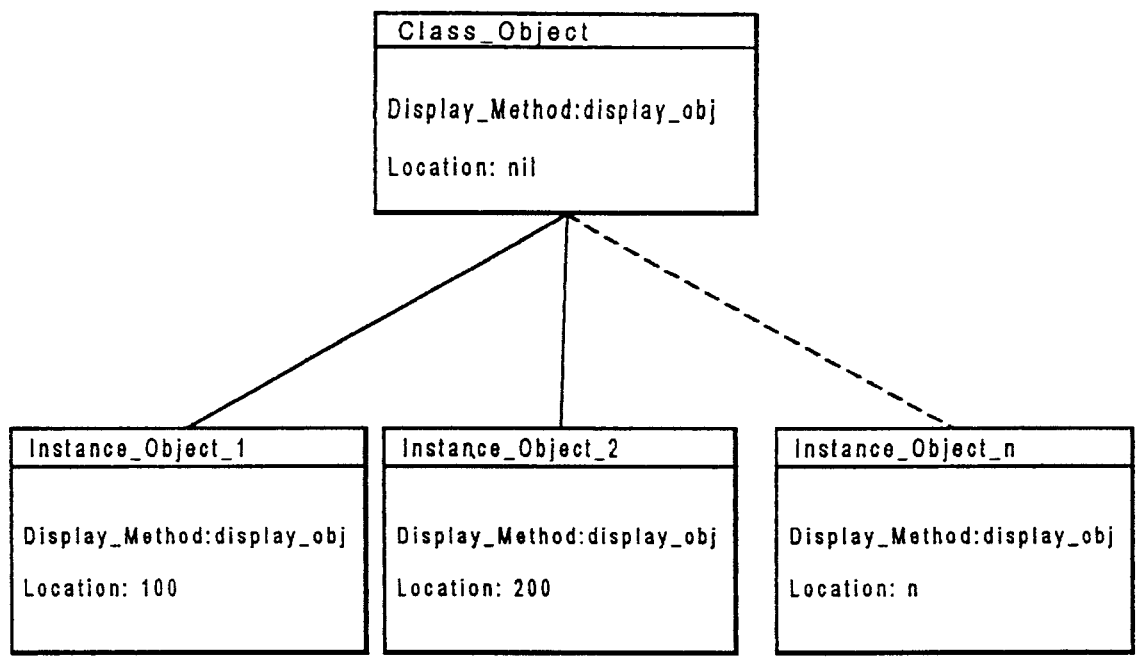
FIG. 5 depicts a typical class-instance hierarchy.

The different entity contacts of a multiple-instance object are defined by an MIO key. The MIO key describes a specific state to instantiates the object. The MIO key can be a reference to another slot in the object, a reference to a slot in a different object, or a reference to a method that returns the key. The MIO key may define the state context for all of the object's MIO slots, as provided in the object's MIO key slot, or any MIO slot may require a unique MIO key, is provided in the MIO key facet of the referenced slot. This allows multiple key definitions for the MIO slot of a multiple-instance object. For example, in FIGS. 1 and 4, slot one may represent the display method for an object, and slot two may represent the location of the object. The display method is the same for all instances of this object class, while the location is unique for each instance. In the typical class-instance hierarchy, as illustrated in FIG. 5, the display method is defined at the class level (display_method), and the value of the display method slot (DISPLAY_OBJ) is defined at the class level also. The instances inherit the slot and its value. The location slot (location) is defined at the class level also, but each instance has a different location value, so the location slot values are defined at each instance. Instance_object_1 has slot location value 100, and instance_object_2 has slot location 200. In the example of FIG. 5, n objects are created.

Figure 6:
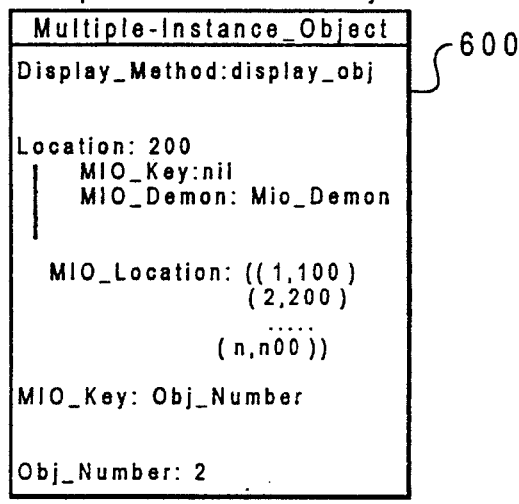
FIG. 6 depicts a multiple-instance object example where only one object is created.

FIG. 6 depicts a multiple-instance object 600 example where only one object is created. Each entity instance has a different location slot value, so a corresponding MIO location slot is created (MIO_location). The unique location values, along with the associated MIO key values for each instance are contained in the MIO location slot. In this example, the MIO key represents the current object number, and the object number is represented as a slot (obj_number) in the object. The unique location values, along with their associated object numbers, are stored as an indexed data structure. In the example, they are stored as an association list. The MIO key is the index into the association list. The current instance of the object has all of its unique slot values instantiated to represent the state defined by the MIO key. In FIG. 6, the location slot is instantiated to 200—the location value of object number two.

Figure 7:
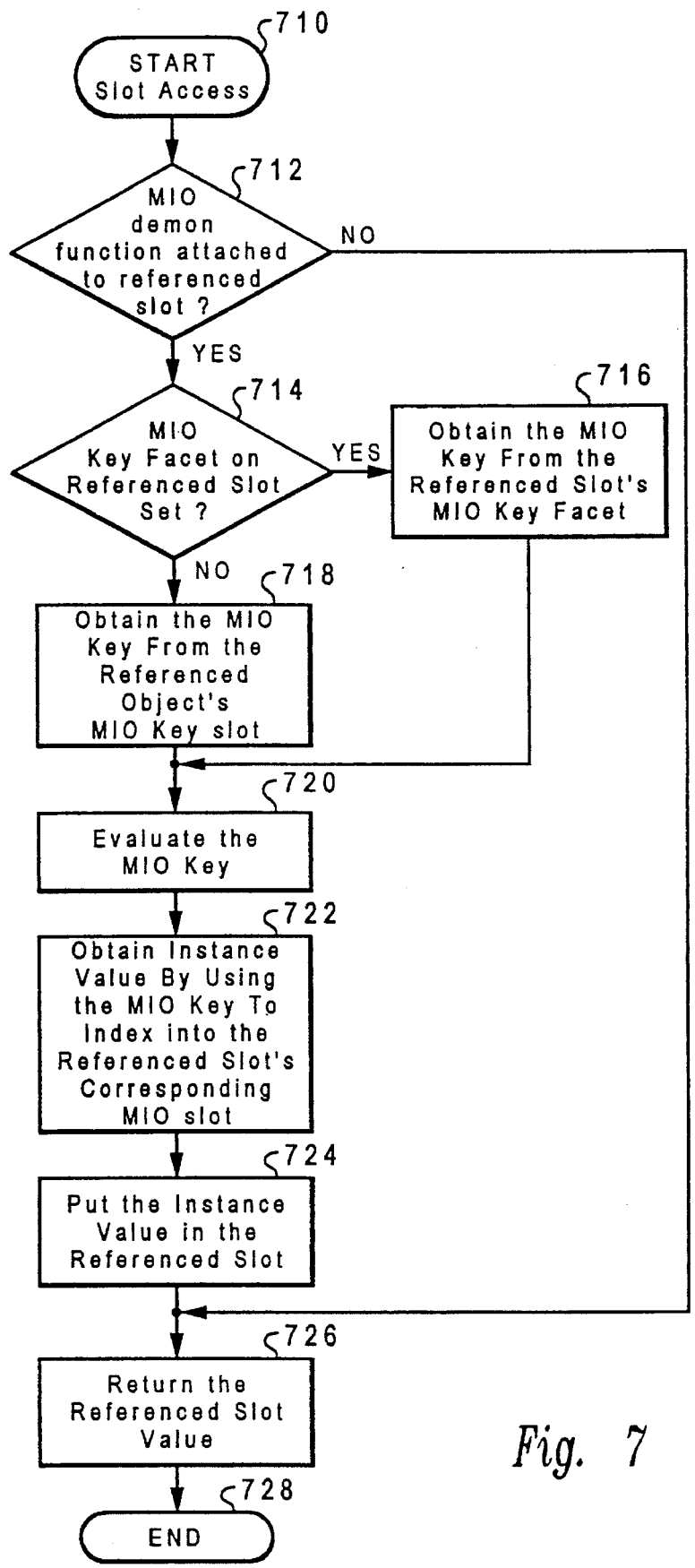
FIG. 7 depicts a flow diagram representing how a multiple-instance object's slots are accessed.

FIG. 7 is a flow diagram representing how a multiple-instance object's slots are accessed. In block 710, the routine to access a slot is started. In block 712, the system determines whether the MIO demon function is attached to a referenced slot, and if so, proceeds to block 714, otherwise, it proceeds to block 726. In block 714, the system determines whether the MIO key facet on the referenced slot is set, and if so, then proceeds to block 716, otherwise, it proceeds to block 718. In block 716, the system obtains the MIO key from the referenced slot's MIO key facet and then proceeds to block 720. In block 718, the system obtains the MIO key from the referenced object's MIO key slot. In block 720, the system evaluates the MIO key, i.e., a data element that can be used to index into a data structure—a number, a symbol, a list or the return value of a function. Then, in block 722, the system obtains the instance value by using the MIO key to index into the referenced slot's corresponding MIO slot. In block 724, the system puts the instance value in the referenced slot. In block 726, the system then returns the referenced slot value to whatever procedure accessed the slot, and in block 728, the system completes the routine.

Figure 8:
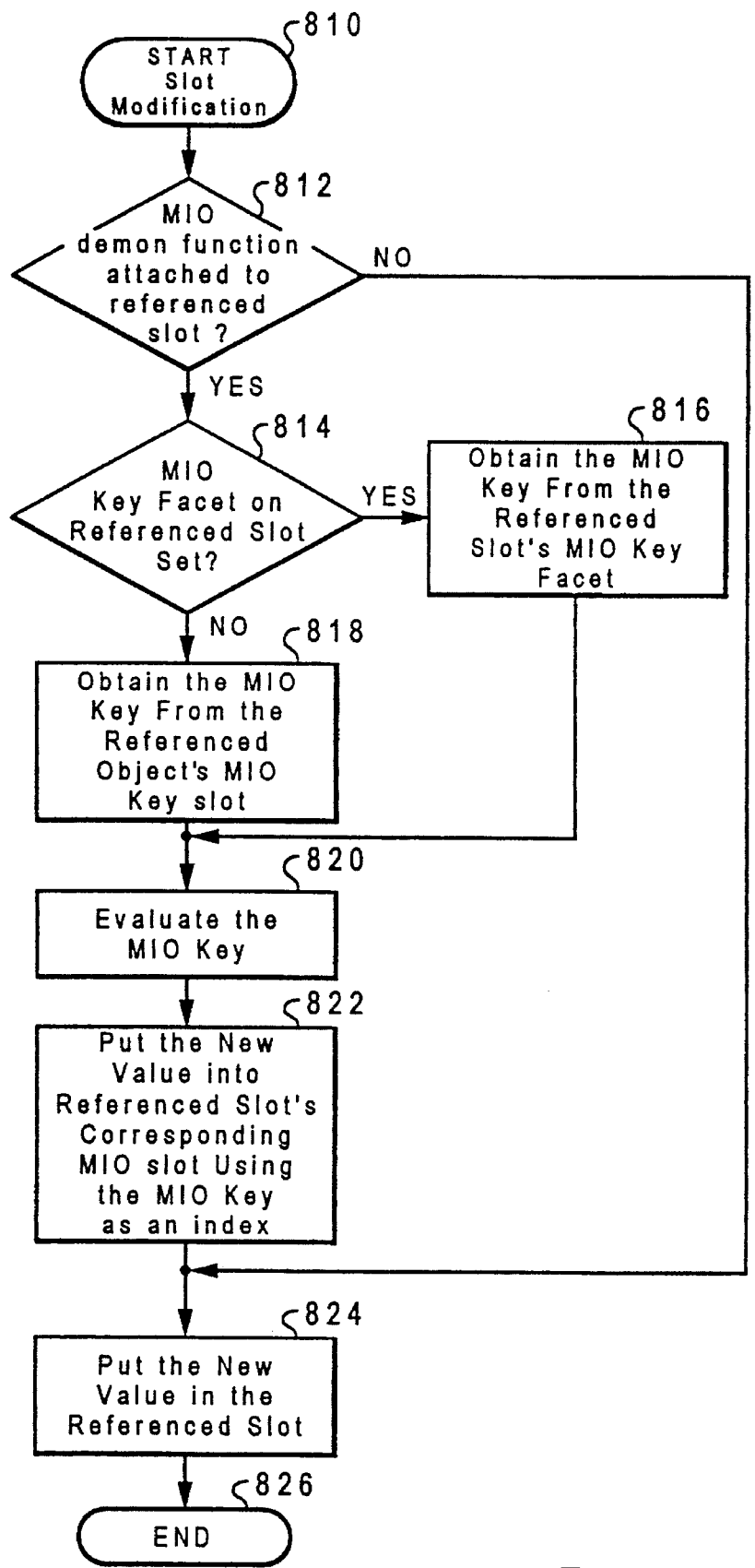
FIG. 8 depicts a flow chart illustrating how a multiple-instance object's slots are modified.

FIG. 8 depicts a flow chart illustrating how a multiple-instance object's slots are modified. In block 810, the system begins execution of the slot modification subroutine. In block 812, the system determines whether the MIO demon function is attached to the referenced slot and if not, proceeds to block 824. Otherwise, the system in block 814, determines whether the MIO key facet is on the referenced slot set, and if so, proceeds to block 816, otherwise, the system proceeds to block 818. In block 816, the system obtains the MIO key from the referenced slot's MIO key facet before proceeding to block 820. In block 818, the system obtains the MIO key from the referenced object's MIO key slot and then proceeds to block 820. In block 820, the system evaluates the MIO key and then, in block 822, the system puts the new value into the referenced slot's corresponding MIO slot using the MIO key as an index. In block 824, the system puts the new value in the referenced slot before ending the subroutine (block 826).

While the invention has been particularly shown and described with reference to a preferred embodiment, it will be understood by those skilled in the art that various changes in form and detail may be made therein without departing from the spirit and scope of the invention.

What is claimed is:

1. In a computer system operating under an object oriented environment, a method for providing a plurality of instances in a single object, comprising the steps of:

providing a slot for all instances having a common value within said single object;

providing a multiple-instance object (MIO) slot, within said single object, for each slot having a different value or different instances;

defining a different entity contact of a multiple-instance object by use of a multiple-instance object (MIO) key.

2. The method according to claim 1 wherein said multiple-instance object key describes a specific state to instantiate said object.

3. The method according to claim 2 wherein said MIO key references to another slot in said object.

4. The method according to claim 2 wherein said MIO key references to a slot in a different object.

5. The method according to claim 2 wherein said MIO key references to a method that returns said MIO key.

6. The method according to claim 1 further comprising the steps of:

assigning said MIO key to an index value;

representing said index value as a particular slot;

storing a unique value associated with an MIO slot as an indexed data structure.

7. The method according to claim 6, wherein said MIO key is indexed into an association list.

8. In a computer system operating in an object oriented environment, a method for accessing slots within a multiple-instance object, comprising the steps of:

determining whether an MIO demon function is attached to a referenced slot;

determining whether an MIO key facet on said referenced slot is set;

if said MIO key facet is set, obtaining said MIO key from said referenced slot MIO key facet;

if said MIO key facet is not set, obtaining said MIO key from an MIO key slot within a referenced object;

evaluating said MIO key;

obtaining an instance value by use of said MIO key to index into said referenced slot's corresponding MIO slot;

placing said instance value in said referenced slot; and returning said referenced slot value.

9. In a computer system operating in an object oriented environment, a method for modifying slots within a multiple-instance object, comprising the steps of:

determining whether an MIO demon function is attached to a referenced slot;

determining whether an MIO key facet is on said referenced slot;

if said MIO key facet is set, obtaining said MIO key from said referenced slot MIO key facet;

if said MIO key facet is not set, obtaining said MIO key from an MIO key slot within a referenced object;

evaluating said MIO key;

placing a new value into said referenced slot's corresponding MIO slot by way of said MIO key as an index; and placing said new value in said referenced slot.

* * * * *